US011326701B2

(12) United States Patent
Chen et al.

(10) Patent No.: US 11,326,701 B2
(45) Date of Patent: May 10, 2022

(54) DISC VALVE

(71) Applicants: Yuan-Lai Chen, Taichung (TW); Da-Tan Liu, Taichung (TW)

(72) Inventors: Yuan-Lai Chen, Taichung (TW); Da-Tan Liu, Taichung (TW)

(*) Notice: Subject to any disclaimer, the term of this patent is extended or adjusted under 35 U.S.C. 154(b) by 0 days.

(21) Appl. No.: 16/985,992

(22) Filed: Aug. 5, 2020

(65) Prior Publication Data

US 2022/0042605 A1    Feb. 10, 2022

(51) Int. Cl.
*F16K 11/052* (2006.01)
*F16K 1/36* (2006.01)
*F16K 1/22* (2006.01)
*F16K 27/02* (2006.01)

(52) U.S. Cl.
CPC .......... *F16K 11/0525* (2013.01); *F16K 1/222* (2013.01); *F16K 1/36* (2013.01); *F16K 27/0209* (2013.01)

(58) Field of Classification Search
CPC .... F16K 11/052; F16K 11/0525; F16K 1/222; F16K 1/22; F16K 1/36; F16K 27/0218; F16K 27/0209
See application file for complete search history.

(56) References Cited

U.S. PATENT DOCUMENTS

| 1,511,544 A | * | 10/1924 | Wagner | F16K 1/22 137/310 |
| 2,351,613 A | * | 6/1944 | Hopkins | F16K 11/0525 137/625.46 |
| 3,194,271 A | * | 7/1965 | Viessmann | F16K 11/0853 137/625.43 |
| 3,228,653 A | * | 1/1966 | Trimmer | F16K 11/0525 251/306 |
| 3,549,123 A | * | 12/1970 | Bell | F16K 1/2261 251/306 |
| 4,358,086 A | * | 11/1982 | Hiltebrand | B32B 15/08 251/306 |
| 4,361,170 A | * | 11/1982 | Peloza | B60H 1/00485 137/625.29 |
| 4,774,977 A | * | 10/1988 | Cohen | F16K 11/0525 137/271 |

(Continued)

FOREIGN PATENT DOCUMENTS

| DE | 2647989 A1 | * | 6/1977 | .......... F16K 11/0525 |
| WO | WO-2017174121 A1 | * | 10/2017 | .......... F16K 1/2261 |

*Primary Examiner* — David Colon-Morales
(74) *Attorney, Agent, or Firm* — Muncy, Geissler, Olds & Lowe, P.C.

(57) ABSTRACT

A disc valve is provided, including: a main body, at least including first, second and third flow passages, the first, second and third flow passages being in communication with each other; a disc, being oval, including a major axis and a minor axis, being rotatably connected to and in the main body, being rotatable about an axis between a first position and a second position; wherein when the disc is located in the first position, the disc discommunicates the first flow passage and the third flow passage and the first flow passage and the second flow passage are in communication with each other; when the disc is located in the second position, the disc discommunicates the first flow passage and the second flow passage and the first flow passage and the third flow passage are in communication with each other.

10 Claims, 8 Drawing Sheets

(56) References Cited

U.S. PATENT DOCUMENTS

| | | | | |
|---|---|---|---|---|
| 5,374,032 A * | 12/1994 | Pearson | ............... | F16K 11/0525 |
| | | | | 251/308 |
| 5,531,248 A * | 7/1996 | Pearson | ............... | F16K 11/0525 |
| | | | | 137/625.46 |
| 6,155,296 A * | 12/2000 | Roman | ............... | B60H 1/00485 |
| | | | | 137/625.29 |
| 6,367,773 B1 * | 4/2002 | Ito | ........................ | F02D 9/101 |
| | | | | 123/337 |
| 6,612,542 B2 * | 9/2003 | Hirota | ................ | B60H 1/00485 |
| | | | | 137/870 |
| 8,308,938 B2 * | 11/2012 | Andreas-Schott | ........................ | |
| | | | | H01M 8/04111 |
| | | | | 210/136 |
| 10,323,752 B2 * | 6/2019 | Andoh | .................... | F16K 31/04 |
| 2010/0219363 A1 * | 9/2010 | Telep | ....................... | F16K 1/22 |
| | | | | 251/305 |

\* cited by examiner

DISC VALVE

BACKGROUND OF THE INVENTION

Field of the Invention

The present invention relates to a disc valve.

Description of the Prior Art

A valve is usually used for controlling a communication of the pipeline. The conventional valve slides along an inner surface of the pipeline to close the pipeline. If there is a need to control the communication of multiple pipelines, each pipeline should be equipped with one valve. By controlling the valves, different path of communication of multiple pipelines can be made. However, the use of the multiple valves will greatly increase the cost, the difficulty of installation repairing and replacing of the multiple valves.

The present invention is, therefore, arisen to obviate or at least mitigate the above-mentioned disadvantages.

SUMMARY OF THE INVENTION

The main object of the present invention is to provide a disc valve which has only one single disc to control communication between a plurality of flow passages and which has a simple structure and is uneasy to malfunction.

To achieve the above and other objects, a disc valve is provided, including: a main body, at least including a first flow passage, a second flow passage and a third flow passage, the first flow passage, the second flow passage and the third flow passage being in communication with each other; a disc, being oval, including a major axis and a minor axis, being rotatably connected to and in the main body, being rotatable about an axis between a first position and a second position; wherein when the disc is located in the first position, the disc discommunicates the first flow passage and the third flow passage and the first flow passage and the second flow passage are in communication with each other; when the disc is located in the second position, the disc discommunicates the first flow passage and the second flow passage and the first flow passage and the third flow passage are in communication with each other.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
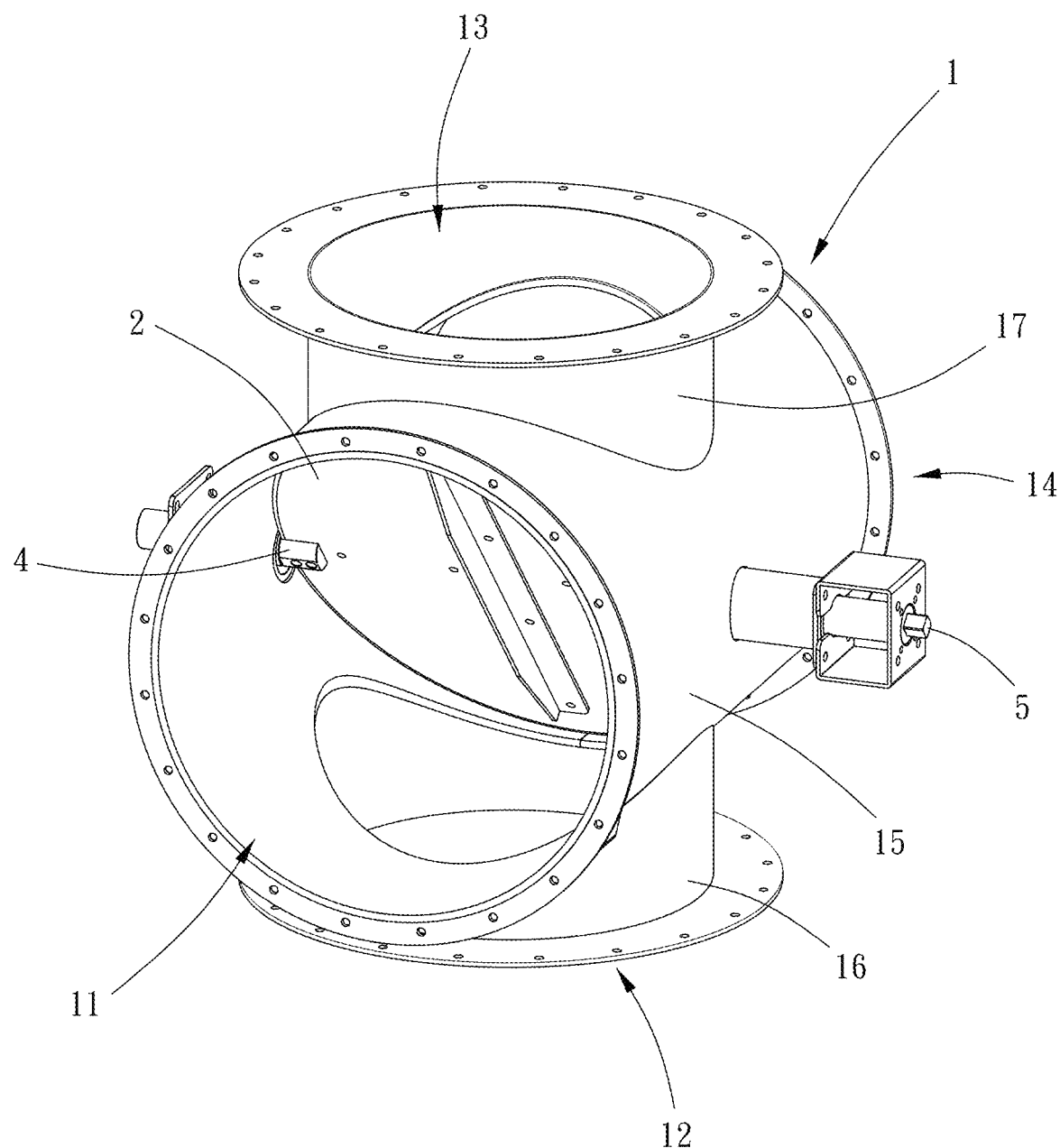
FIG. 1 is a stereogram of a preferable embodiment of the present invention.
Figure 2:
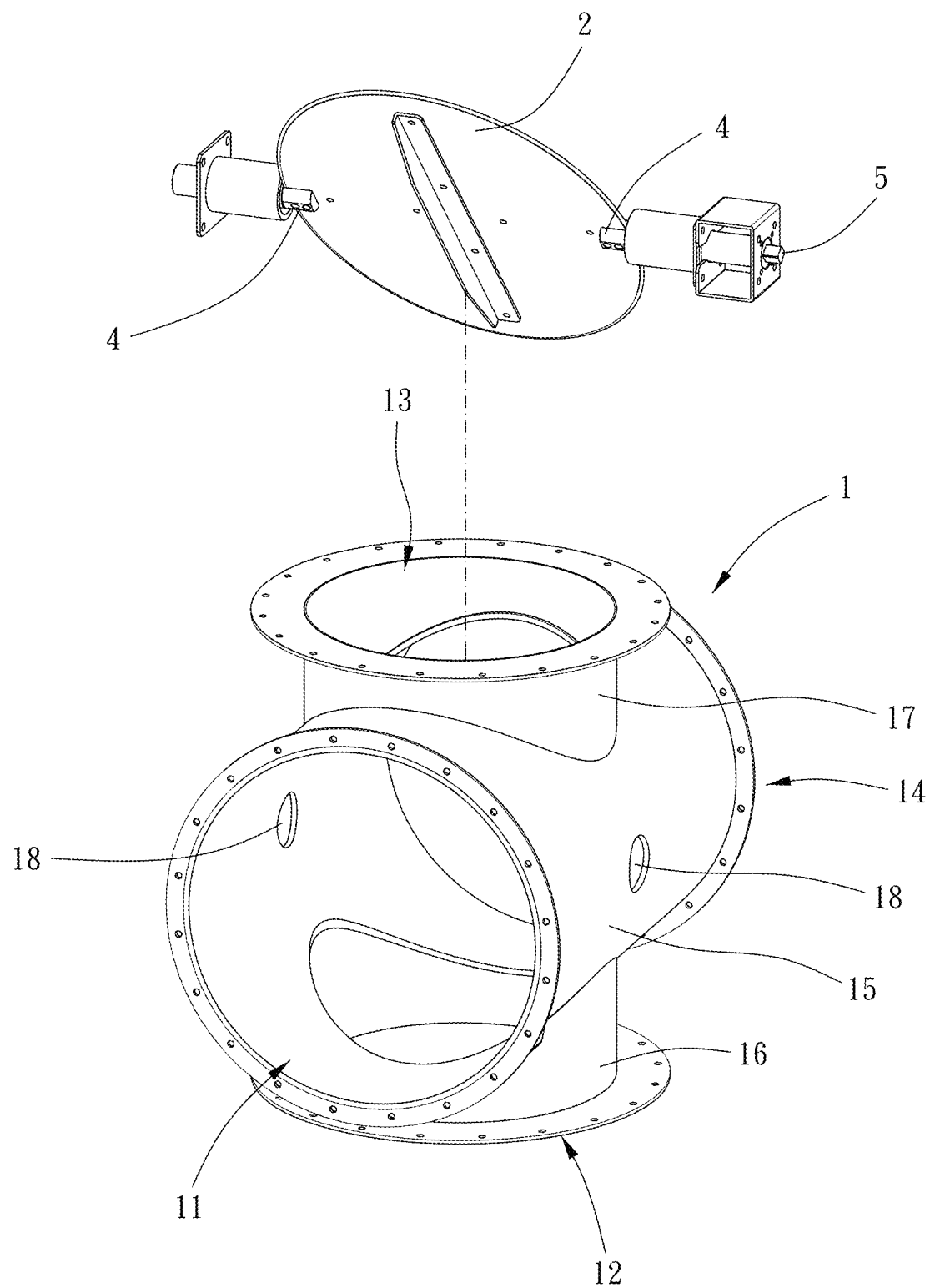
FIG. 2 is a breakdown drawing of a preferable embodiment of the present invention.
Figure 3:
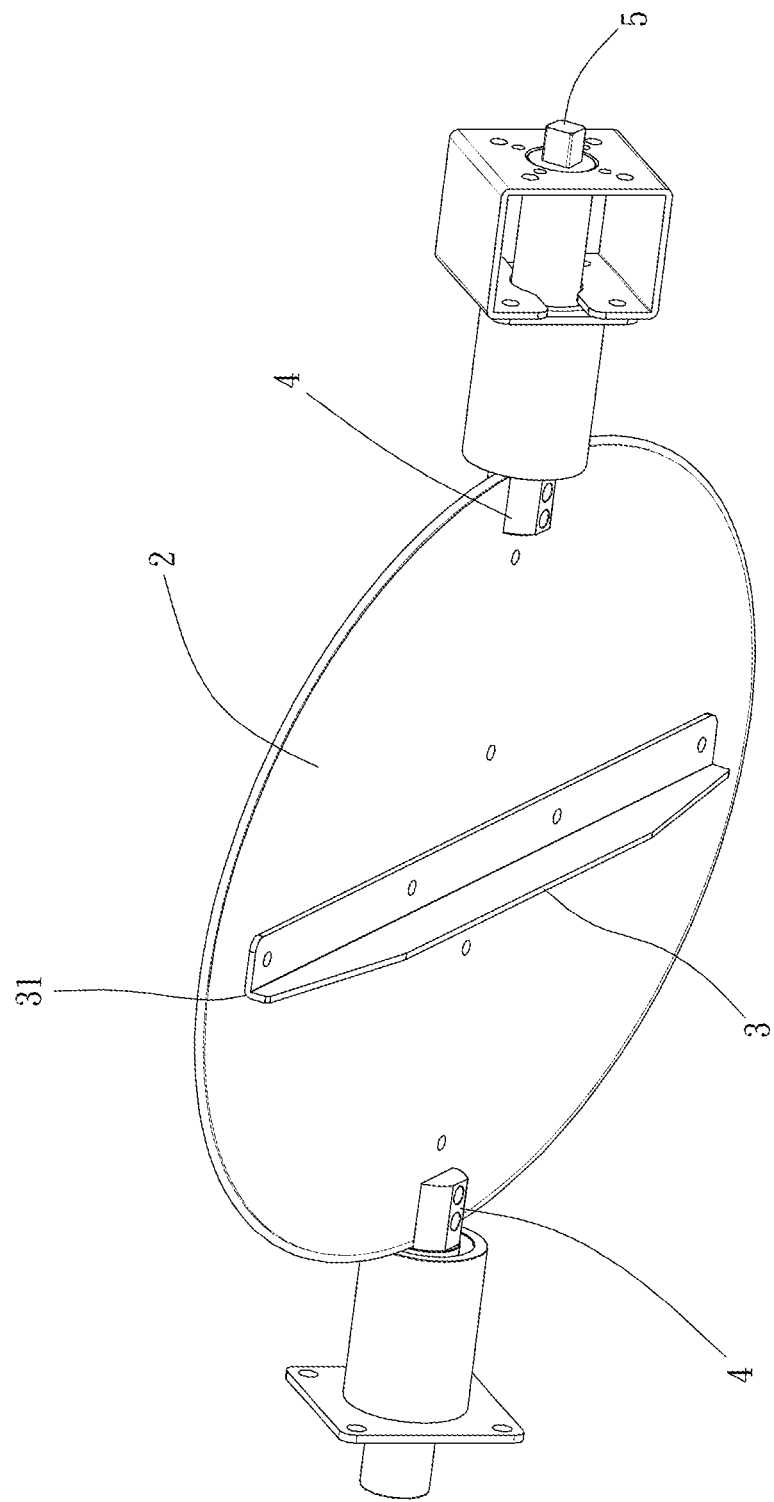
FIG. 3 is a partial stereogram of a preferable embodiment of the present invention.
Figure 4:
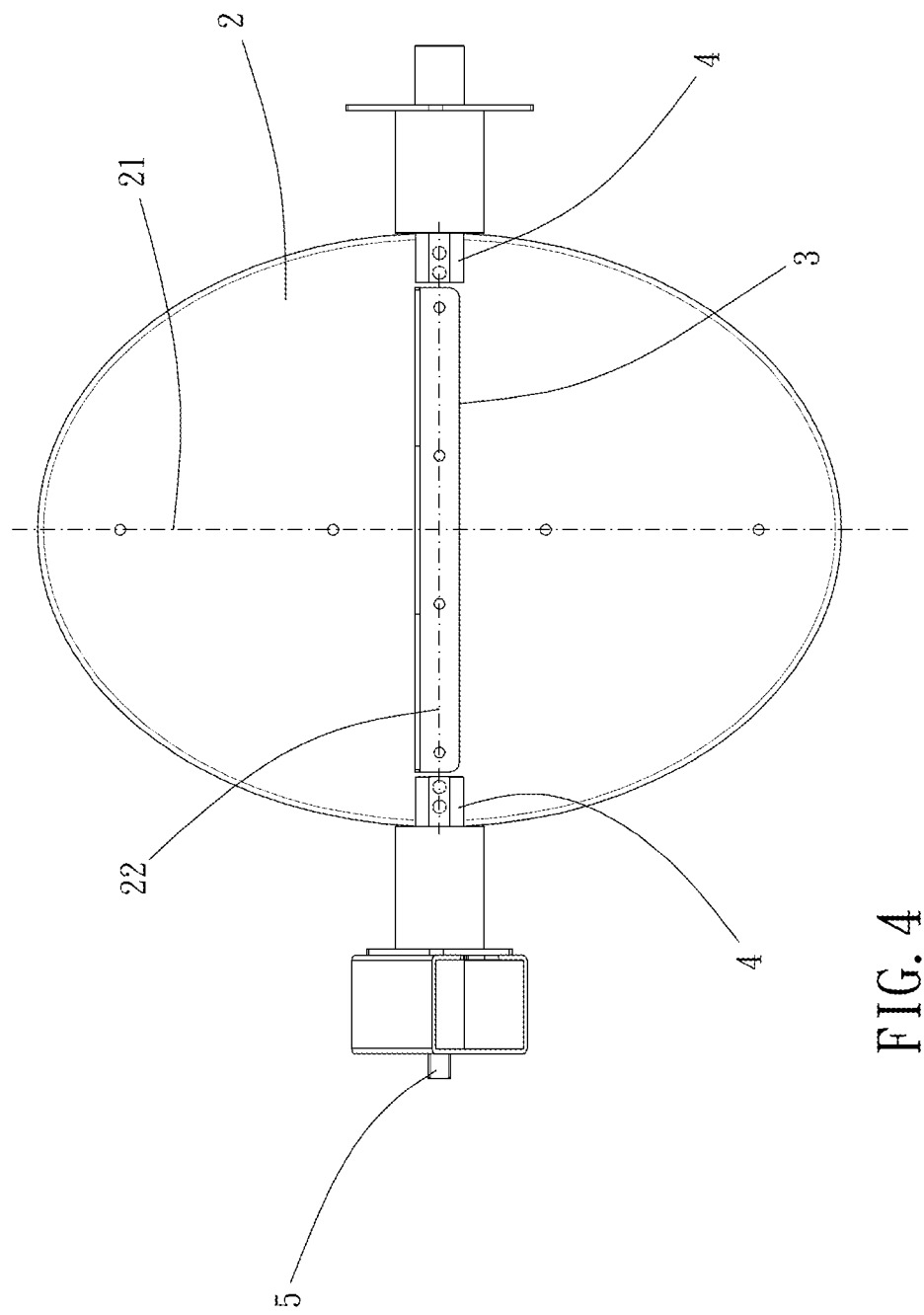
FIG. 4 is a side view of FIG. 3.

Please refer to FIGS. 1 to 7 for a preferable embodiment of the present invention. A disc valve 1 of the present invention includes a main body 1 and a disc 2.

The main body 1 at least includes a first flow passage 11, a second flow passage 12 and a third flow passage 13, and the first flow passage 11, and the second flow passage 12 and the third flow passage 13 are in communication with each other.

The disc 2 is oval and includes a major axis 21 and a minor axis 22, and the disc 2 is rotatably connected to and in the main body 1, and is rotatable about an axis between a first position and a second position.

Figure 5:
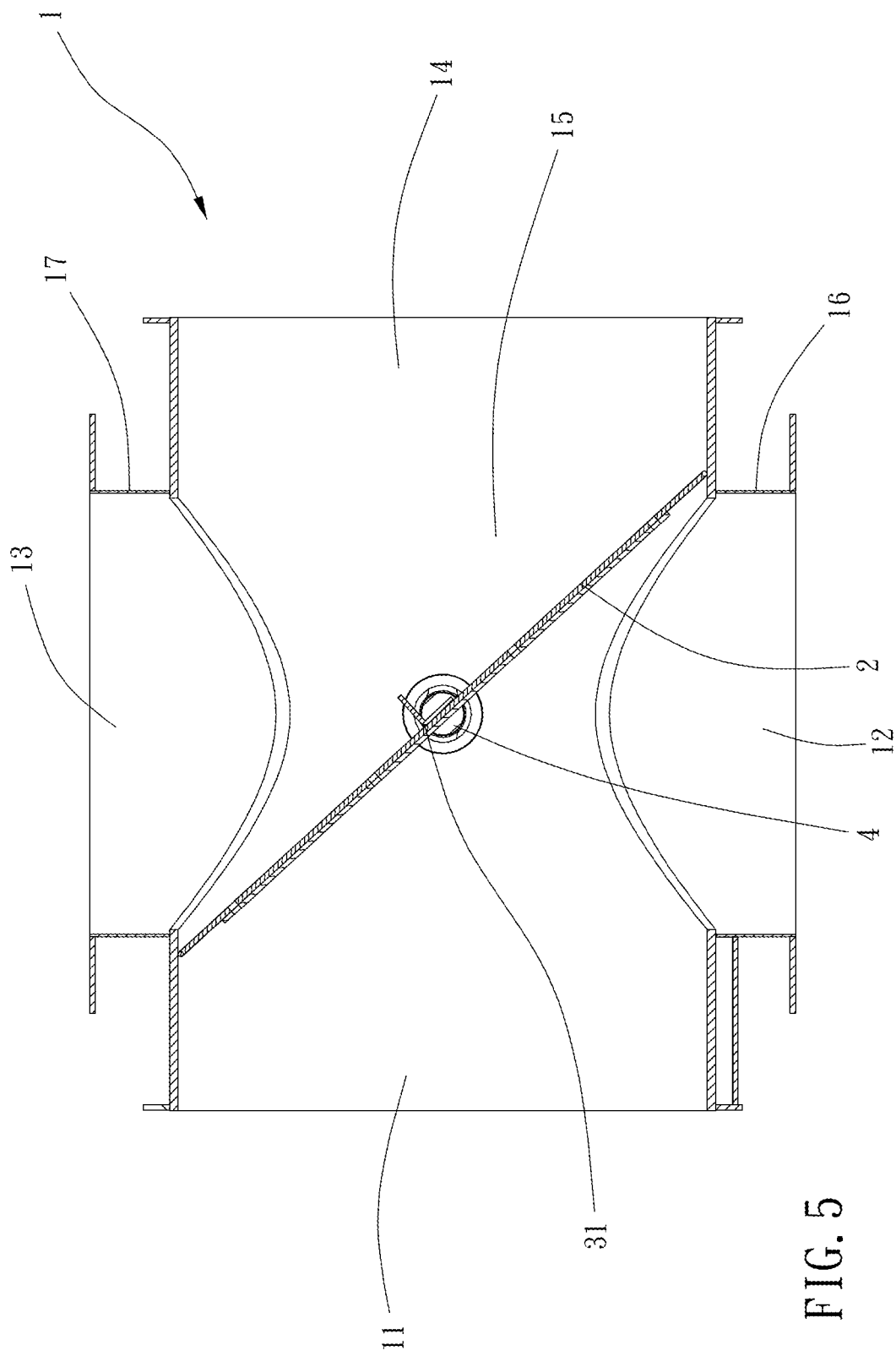
FIGS. 5 to 7 are drawings showing operation of a preferable embodiment of the present invention.
Figure 6:
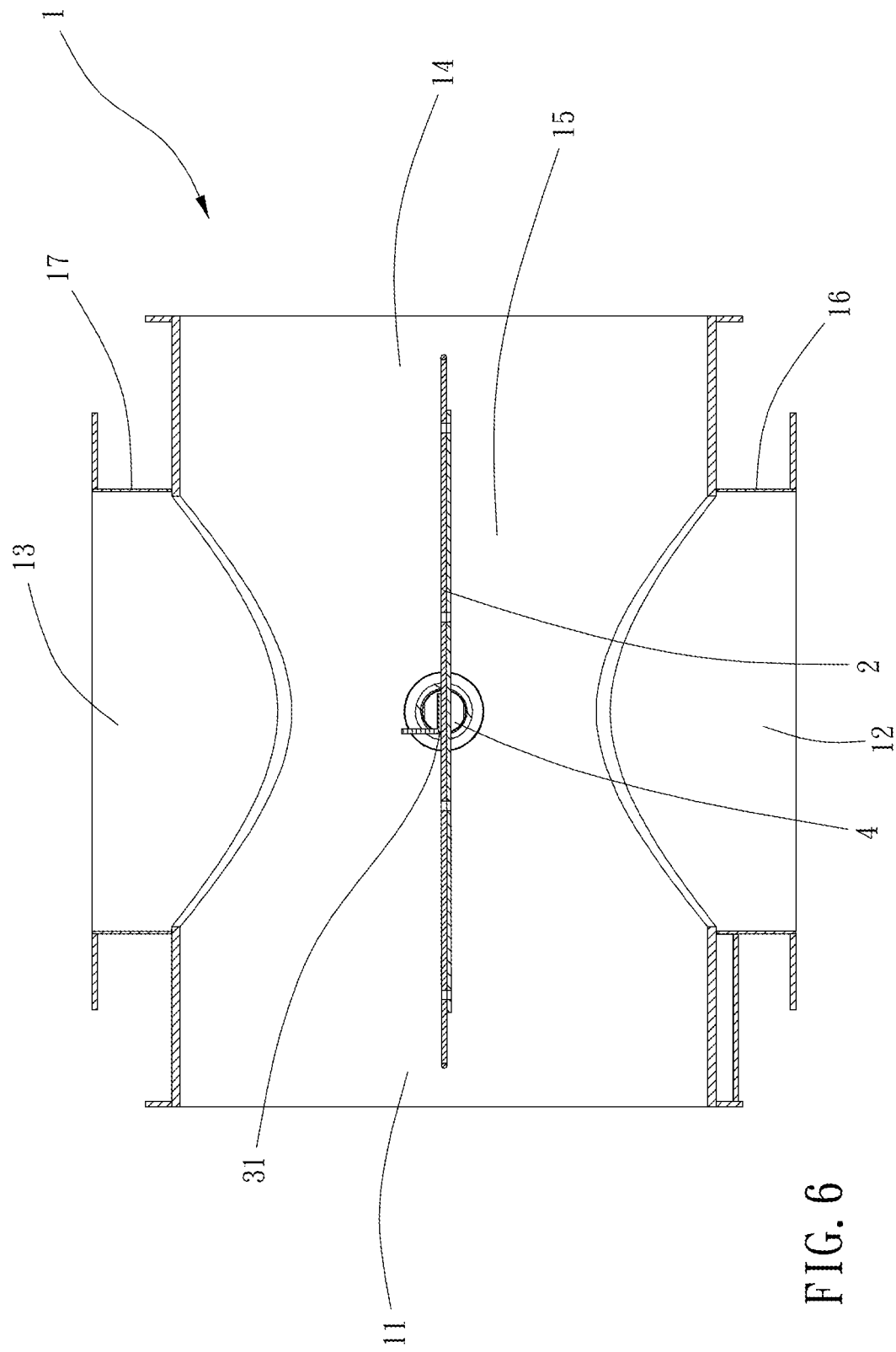
Figure 7:
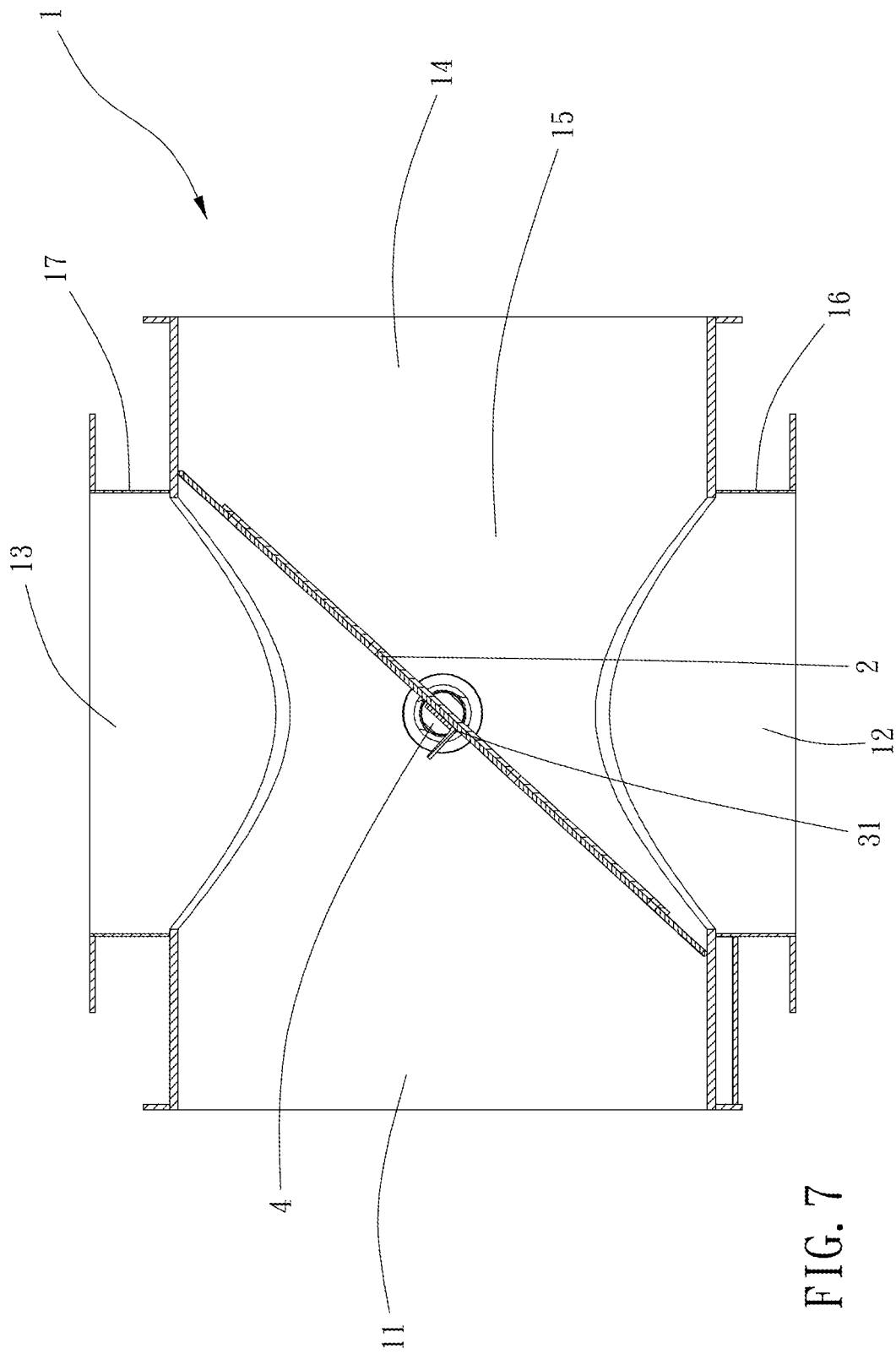

When the disc 2 is located in the first position (as shown in FIG. 5), the disc 2 discommunicates the first flow passage 11 and the third flow passage 13 and the first flow passage 11 and the second flow passage 12 are in communication with each other. When the disc 2 is located in the second position (as shown in FIG. 7), the disc 2 discommunicates the first flow passage 11 and the second flow passage 12 and the first flow passage 11 and the third flow passage 13 are in communication with each other. When the disc 2 rotates to be located between the first position and the second position (as shown in FIG. 6), the first flow passage 11, the second flow passage 12 and the third flow passage 13 are in communication with each other. As a result, only one single disc is required to control communication between a plurality of flow passages, and the disc has a simple structure and is uneasy to malfunction.

Specifically, the disc 2 is rotatable about the minor axis 22, the main body 1 further includes two through holes 18 opposite to each other, and two axels 4 are assembled to the two through holes 18 along the minor axis 22 and the disc 2 connected with the disc 2, respectively. Preferably, a rotation member 5 is connected with one of the two axels 4 and is located outside the main body 1, for rotating the disc 2, wherein the rotation member 5 may be driven by a motor or any driving means.

Specifically, the first flow passage 11, the second flow passage 12 and the third flow passage 13 are arranged around the axis about which the disc 2 rotates. The second flow passage 12 and the third flow passage 13 are located laterally at two opposite sides by the minor axis 22.

The main body 1 further includes a first pipeline 15, the disc 2 is rotatably disposed in the first pipeline 15, and the first flow passage 11 is disposed at an end of the first pipeline 15. In this embodiment, the first pipeline 15 is circular, and a diametric dimension of the minor axis 22 is equal to an inner diametric dimension of the first pipeline 15.

Preferably, the main body 1 further includes a second pipeline 16 and a third pipeline 17, the second pipeline 16 and the third pipeline 17 are respectively connected laterally to the first pipeline 15 and located at two opposite sides of the first pipeline 15, the second flow passage 12 is disposed at the second pipeline 16, and the third flow passage 13 is disposed at the third pipeline 17. Specifically, when the disc 2 is located between the first position and the second position, the disc 2 does not project within the second pipeline 16 and the third pipeline 17, wherein a diametric dimension of the major axis 21 is greater than any of inner diametric dimensions of the second pipeline 16 and the third pipeline 17, for discommunicating the first flow passage 11 and the second flow passage 12 or discommunicating the first flow passage 11 and the third flow passage 13.

The main body 1 further includes a fourth flow passage 14, and the fourth flow passage 14 is disposed at the first pipeline 15 and opposite to the first flow passage 11. As shown in FIGS. 5 to 7, when the disc 2 is located in the first position, the disc 2 is abutted against an upper portion of the first flow passage 11 and abutted against a lower portion of the fourth flow passage 14 so that the third flow passage 13 and the fourth flow passage 14 are in communication with each other; when the disc 2 is located in the second position, the disc 2 is abutted against a lower portion of the first flow passage 11 and abutted against an upper portion of the fourth flow passage 14 so that the second flow passage 12 and the fourth flow passage 14 are in communication with each other. The disc 2 is integrally formed of one piece. The disc valve further includes a L-shaped plate 3, and the L-shaped plate 3 is disposed on a side of the disc 2 and extends along the minor axis 22. When the disc 2 is located in the first position, an outer corner portion 31 of the L-shaped plate 3 points toward the first flow passage 11, and when the disc 2 is located in the second position, the outer corner portion 31 of the L-shaped plate 3 points toward the second flow passage 12.

Figure 8:
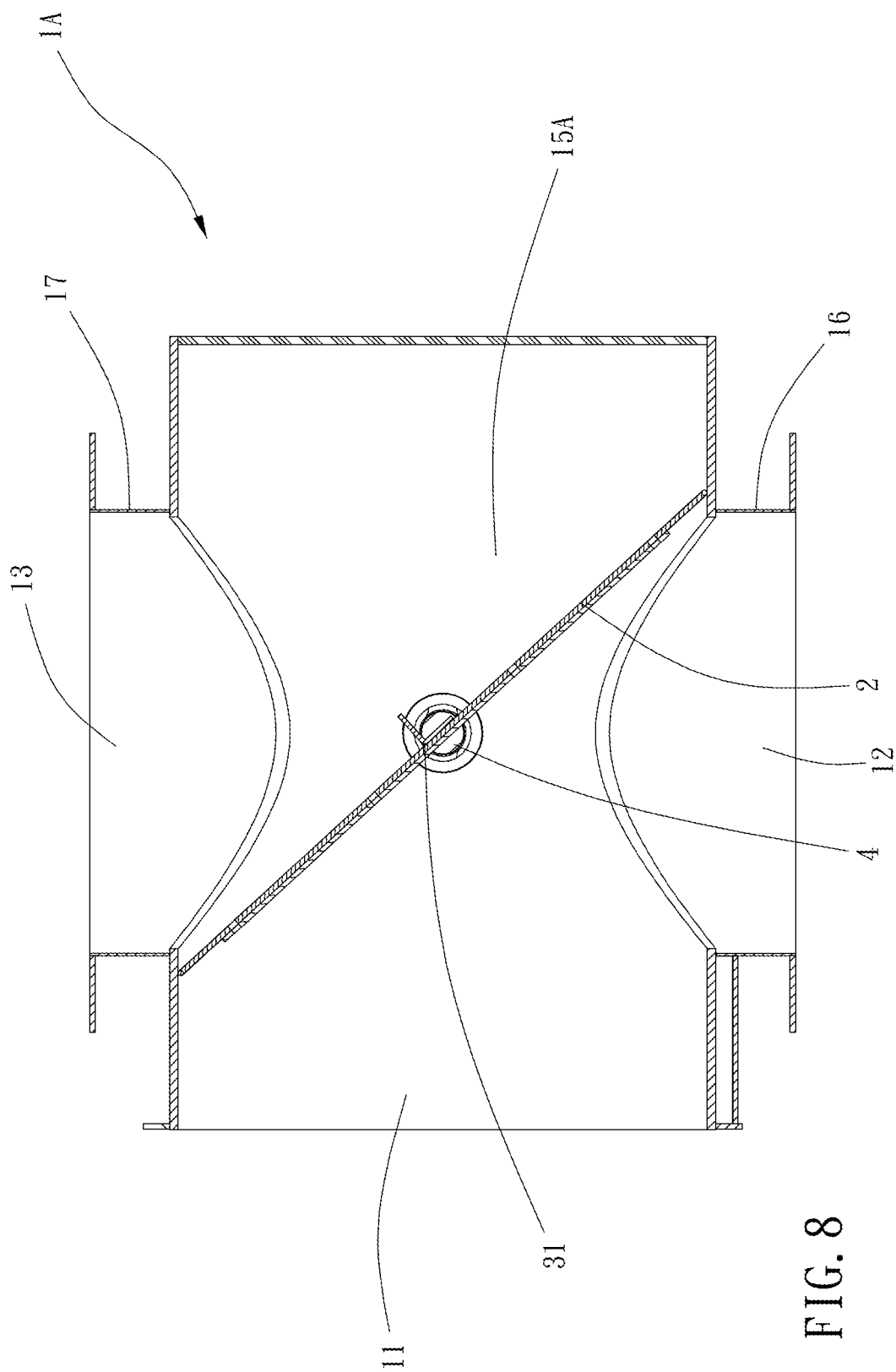
FIG. 8 is a drawing shown another preferable embodiment of the present invention.

The main body 1 is a four-way tube, the first flow passage 11 and the fourth flow passage 14 are linearly arranged, the second flow passage 12 and the third flow passage 13 are linearly arranged and lateral to the first flow passage 11 and fourth flow passage 14. It is noted that the arrangement of the first flow passage, second flow passage, third flow passage and the fourth flow passage may be configured in different configuration. In an alternative embodiment as shown in FIG. 8, the first pipeline 15A of the main body 1A is provided without a fourth flow passage, the main body 1A is a tee tube.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A disc valve, including:
   a main body, at least including a first flow passage, a second flow passage and a third flow passage, the first flow passage, the second flow passage and the third flow passage being in communication with each other;
   a disc, being oval, including a major axis and a minor axis, being rotatably connected to and in the main body, being rotatable about an axis between a first position and a second position;
   wherein when the disc is located in the first position, the disc discommunicates the first flow passage and the third flow passage and the first flow passage and the second flow passage are in communication with each other; when the disc is located in the second position, the disc discommunicates the first flow passage and the second flow passage and the first flow passage and the third flow passage are in communication with each other;
   wherein the disc is integrally formed of one piece;
   wherein the disc valve further includes a L-shaped plate, the L-shaped plate is disposed on a side of the disc and extends along the minor axis, when the disc is located in the first position, an outer corner portion of the L-shaped plate points toward the first flow passage, and when the disc is located in the second position, the outer corner portion of the L-shaped plate points toward the second flow passage.

2. The disc valve of claim 1, wherein the disc is rotatable about the minor axis, the main body further includes two through holes opposite to each other, and two axels are assembled to the two through holes along the minor axis and connected with the disc, respectively.

3. The disc valve of claim 1, wherein the first flow passage, the second flow passage and the third flow passage are arranged around the axis about which the disc rotates.

4. The disc valve of claim 1, wherein the second flow passage and the third flow passage are located laterally at two opposite sides by the minor axis.

5. The disc valve of claim 1, wherein the main body further includes a first pipeline, the disc is rotatably disposed in the first pipeline, and the first flow passage is disposed at an end of the first pipeline.

6. The disc valve of claim 5, wherein the main body further includes a second pipeline and a third pipeline, the second pipeline and the third pipeline are respectively connected laterally to the first pipeline and located at two opposite sides of the first pipeline, the second flow passage is disposed at the second pipeline, and the third flow passage is disposed at the third pipeline.

7. The disc valve of claim 5, wherein a diametric dimension of the minor axis is equal to an inner diametric dimension of the first pipeline.

8. The disc valve of claim 5, wherein a diametric dimension of the major axis is greater than any of inner diametric dimensions of the second pipeline and the third pipeline, and the disc does not project within the second pipeline and the third pipeline.

9. The disc valve of claim 5, wherein the main body further includes a fourth flow passage, the fourth flow passage is disposed at the first pipeline and opposite to the first flow passage; when the disc is located in the first position, the disc is abutted against an upper portion of the first flow passage and abutted against a lower portion of the fourth flow passage so that the third flow passage and the fourth flow passage are in communication with each other; when the disc is located in the second position, the disc is abutted against a lower portion of the first flow passage and abutted against an upper portion of the fourth flow passage so that the second flow passage and the fourth flow passage are in communication with each other.

10. The disc valve of claim 2, wherein the first flow passage, the second flow passage and the third flow passage are arranged around the axis about which the disc rotates; the second flow passage and the third flow passage are located laterally at two opposite sides by the minor axis; the main body further includes a first pipeline, the disc is rotatably disposed in the first pipeline, and the first flow passage is disposed at an end of the first pipeline; the main body further includes a second pipeline and a third pipeline, the second pipeline and the third pipeline are respectively connected laterally to the first pipeline and located at two opposite sides of the first pipeline, the second flow passage is disposed at the second pipeline, and the third flow passage is disposed at the third pipeline; a diametric dimension of the minor axis is equal to an inner diametric dimension of the first pipeline; a diametric dimension of the major axis is greater than any of inner diametric dimensions of the second pipeline and the third pipeline, and the disc does not project within the second pipeline and the third pipeline; the main body further includes a fourth flow passage, the fourth flow passage is disposed at the first pipeline and opposite to the first flow passage; when the disc is located in the first position, the disc is abutted against an upper portion of the first flow passage and abutted against a lower portion of the fourth flow passage, and the third flow passage and the fourth flow passage are in communication with each other; when the disc is located in the second position, the disc is abutted against a lower portion of the first flow passage and abutted against an upper portion of the fourth flow passage, and the second flow passage and the fourth flow passage are in communication with each other; the main body is a four-way tube; the first flow passage and the fourth flow passage are linearly arranged, the second flow passage and the third flow passage are linearly arranged and lateral to the first flow passage and fourth flow passage; a rotation member is connected with one of the two axels and is located outside the main body; the first pipeline is circular.

* * * * *